July 31, 1962    S. GEORGE    3,047,220
SELECTING APPARATUS FOR VARIABLE TRANSMISSION
Original Filed Jan. 30, 1958    8 Sheets-Sheet 1

INVENTOR
Stephen George
BY
ATTORNEY

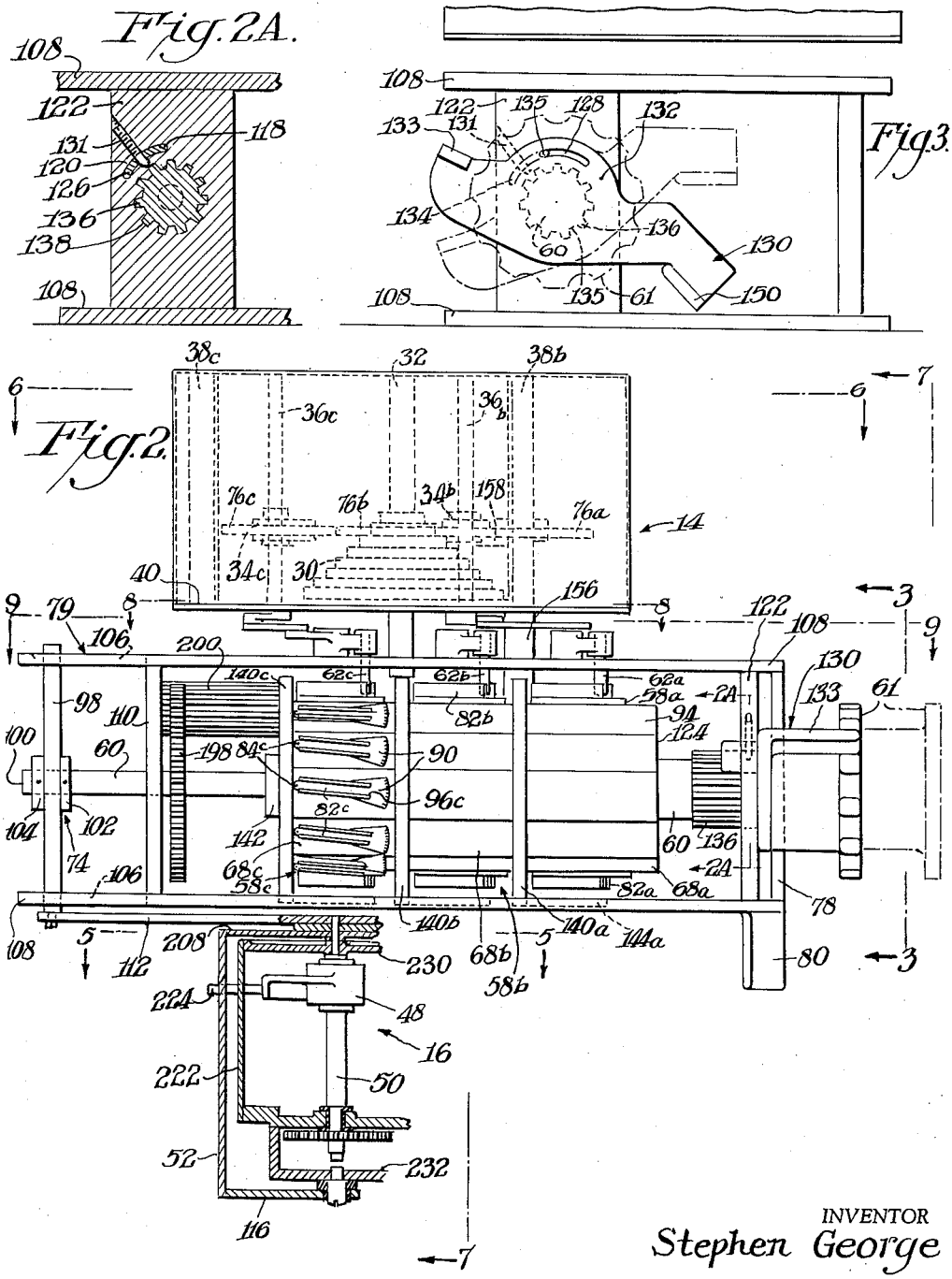

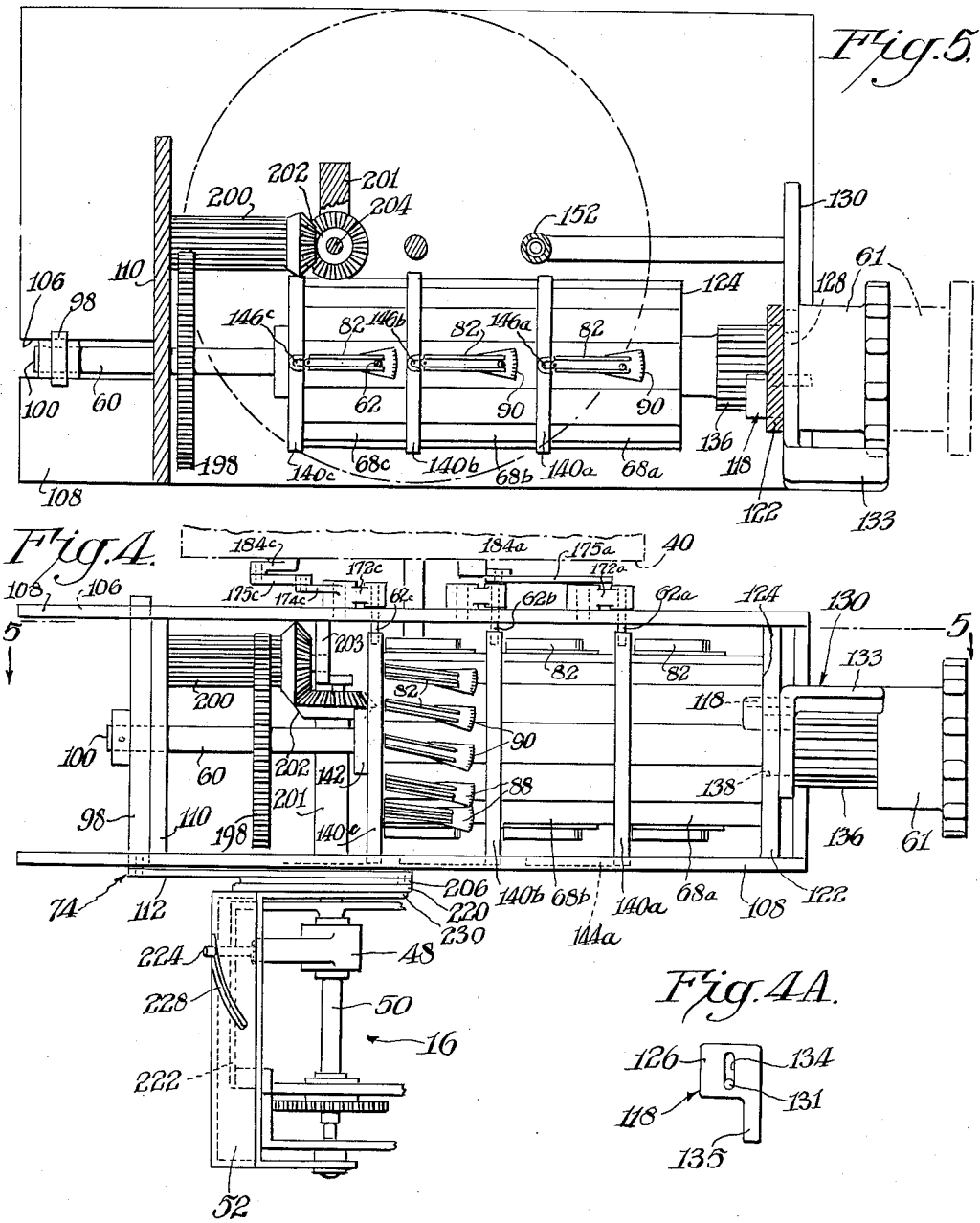

July 31, 1962 S. GEORGE 3,047,220
SELECTING APPARATUS FOR VARIABLE TRANSMISSION
Original Filed Jan. 30, 1958 8 Sheets-Sheet 4

INVENTOR
Stephen George
ATTORNEY

July 31, 1962 S. GEORGE 3,047,220
SELECTING APPARATUS FOR VARIABLE TRANSMISSION
Original Filed Jan. 30, 1958 8 Sheets-Sheet 5
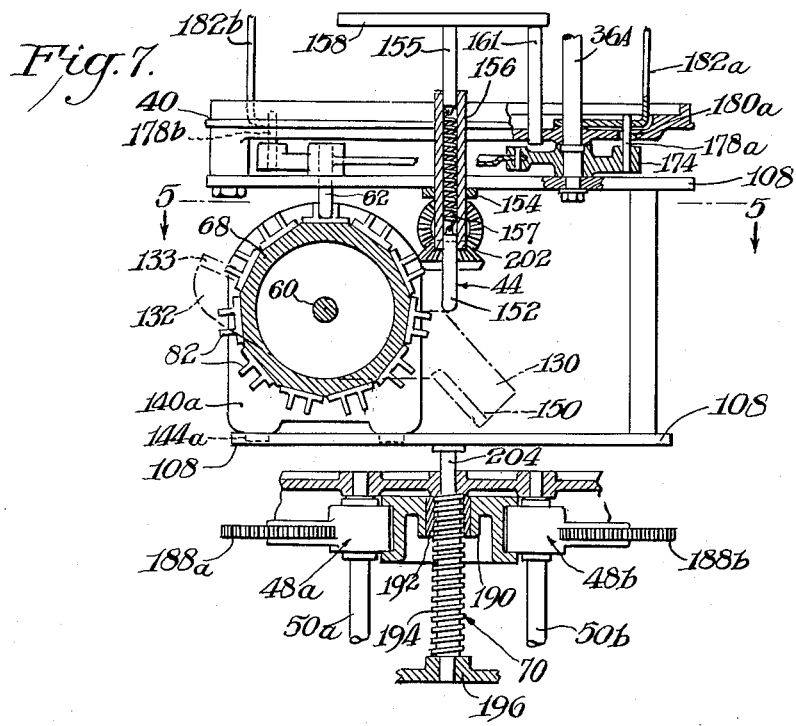
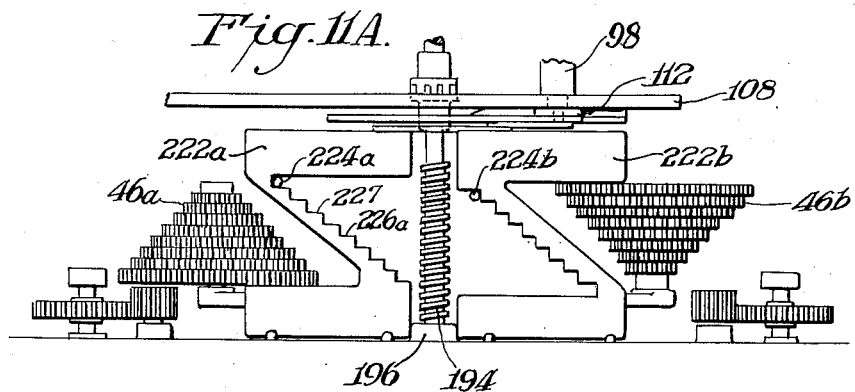
INVENTOR
Stephen George
BY
ATTORNEY INVENTOR
Stephen George BY
*T. Wallace Orum*
ATTORNEY

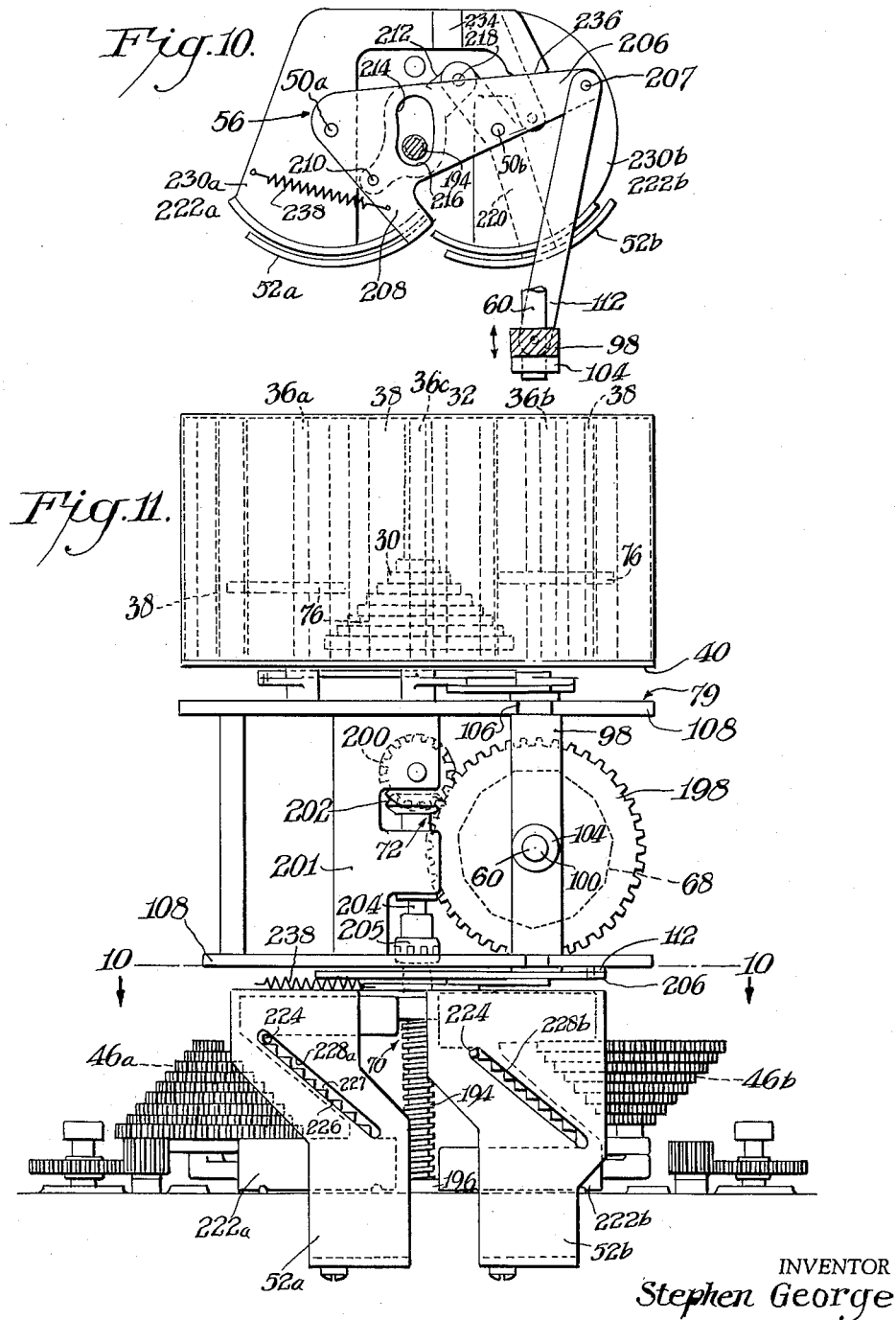

July 31, 1962 S. GEORGE 3,047,220
SELECTING APPARATUS FOR VARIABLE TRANSMISSION
Original Filed Jan. 30, 1958 8 Sheets-Sheet 8
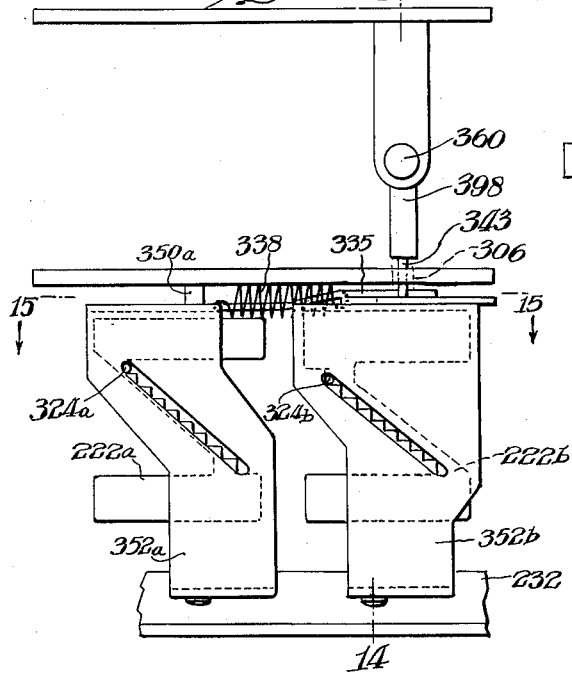
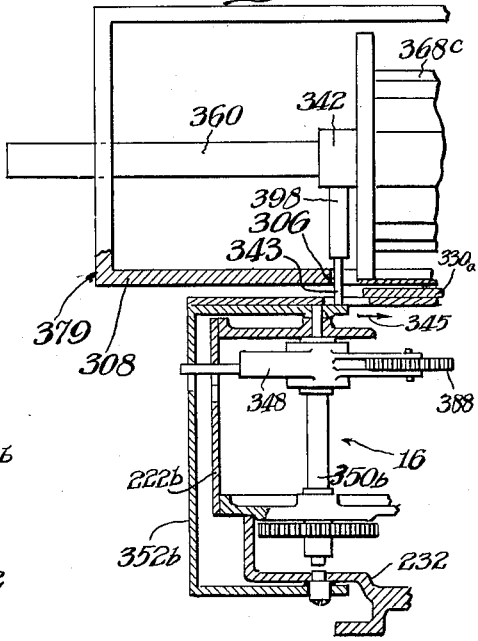
INVENTOR
Stephen George
BY
ATTORNEY

United States Patent Office 3,047,220
Patented July 31, 1962

3,047,220
SELECTING APPARATUS FOR VARIABLE
TRANSMISSION
Stephen George, Pompton Lakes, N.J., assignor, by mesne
assignments, to Symington-Wayne Corporation, Salisbury, Md., a corporation of Maryland
Continuation of application Ser. No. 712,206, Jan. 30, 1958. This application Dec. 14, 1961, Ser. No. 160,697
24 Claims. (Cl. 235—61)

This invention relates to selecting devices for variable-ratio motion-transmitting apparatus including step cone and idler gear assemblies, and more particularly relates to forms of such devices which are advantageously operatively associated with a fluid-dispensing unit.

A novel apparatus for proportioning and dispensing a range of blends of dissimilar fluids is disclosed and claimed in copending, commonly assigned patent application Serial Number 659,743, filed May 15, 1957, now Patent No. 2,927,716. That application describes a novel variable-ratio fluid-blending unit which is connected to a single price and quantity computer. That computer is, for example, of the type described in U.S. Letters Patent 2,264,557. Its adjustment involves an inconvenient reaching inside to separately adjust as many as three independent gear transmissions. It is, therefore, difficult and almost impossible to rapidly change its price-varying ratio controls. Furthermore, a similar and almost as awkward an operation is involved in changing the proportioning ratio of the aforementioned blending unit.

Even though the aforementioned type of blending and dispensing apparatus is highly efficient and simple and economical in structure, it, therefore, could not be rapidly adjusted enough to permit the blending ratio and corresponding price ratio settings to be conveniently shifted, for example, at the option of a purchaser to dispense any one of a given range of differently priced blends. The apparatus disclosed in the aforementioned copending application is, therefore, used in the form therein described for dispensing one preselected blend over a substantially extended period of time, for example, for an entire day.

It is, accordingly, an object of this invention to provide a simple, economical, and dependable device for rapidly and conveniently changing the ratio setting of the price and quantity computer and the proportioning control in such dispensers.

Another object is to provide such devices which are coordinated with each other to permit rapid, convenient and substantially simultaneous selection of a particular blend of dissimilar fluids from a range of such blends and of a corresponding setting of the price computer ratio controls for correctly calculating the cost per unit and total cost of the selected blend.

In accordance with this invention, an apparatus for dispensing a range of predetermined proportional blends of dissimilar fluids includes a proportion-varying control coordinated with a single quantity and price computer. Both the proportion-varying control and computer have sets of idler carriage and step cone gear assemblies mounted upon parallel shafts. A selector device is coordinated with the computer and the proportion-varying control to permit the convenient and substantially simultaneous selection of a particular proportional blend and the setting of the price computer ratio controls for calculating the corresponding cost per unit and total cost of the selected blend.

This selector device includes sets of multiple cam and follower means operatively associated with each of the sets of cone and idler gear assemblies in the computer. These multiple cam means include variable discrete elements corresponding in number to a predetermined number of variations of settings of the computer, and they are variable over a range corresponding to the range of variable engagement of the associated sets of cone and idler gear assemblies. The follower means associated with each of these multiple cams are each operatively connected to an idler gear carriage assembly to permit its associated cam to move the carriage in one plane of movement to align it to engage a predetermined step of the cone gear.

A guide means is mounted on the computer adjacent each of the idler gear carriages, and projection and slot means operatively connect these carriages with these guide means to influence the idler gear carriages to move in a path aligned with successive steps of the cone gears. An actuating means is connected to each of the idler gear carriages to move these carriages in another plane of movement to engage and disengage the idler gear carriages from the cone gear. The guide means is constructed and arranged to permit limited movement of the idler gear carriages in poth planes to control the engaging and disengaging movements of the idler gears and to control the movement of the carriages when disengaged to positions in line with selected steps of the cone gears.

A selector means is associated with the multiple cam and follower means for connecting a preselected one of the discrete elements of each of the cams to the follower of the associated idler gear carriage. When the actuating means moves this idler gear carriage in one plane through the limited movement controlled by the guide means, the associated idler gear is disengaged from a step of the cone gear with which it has been engaged, and subsequent movement by the preselected discrete cam means in the other plane of movement positions the idler gear in line with another preselected step of the cone gear.

The proportion-varying control includes additional guide means connected to its idler gear carriages. Linear transport means is operatively associated with the idler gear carriages of the proportion-varying control for moving these carriages in a longitudinal direction along their shafts. The guide means associated with the proportion-varying control includes slots disposed in a direction substantially equidistantly spaced from a line through corresponding elements of the additional cone gears to guide the movement of the idler gears to positions in line with successive steps of the cone gears. These guide means are movably mounted under the influence of additional actuating means in a manner which causes rotation of the additional idler gear carriages in a direction which disengages their idler gears from associated cone gears.

Coordinated means operatively associates the selector means (coupled with the multiple cam and follower means) with the linear transport means (coupled with the proportion-varying control) to permit the price settings corresponding to each of the predetermined blends selected by the proportion-varying control to be conveniently set into the computer substantially simultaneously with the selection of each of the predetermined blends. The actuating means associated with the idler gear carriages of the computer and proportion-varying control are also, for example, coordinated through the selector means, actuating means, and an interlock means to disengage the idler gears from associated cone gears in both the computer and proportion-varying control before the subsequent substantially simultaneous realignment which accomplishes blend and price selection.

Novel features and advantages of the present invention will become apparent to one skilled in the art from a reading of the following description in conjunction with the accompanying drawings wherein similar reference characters refer to similar parts and in which:

FIG. 2 is a side view in elevation, partially in cross section of a portion of the embodiment shown in FIG. 1;

Figure 1:
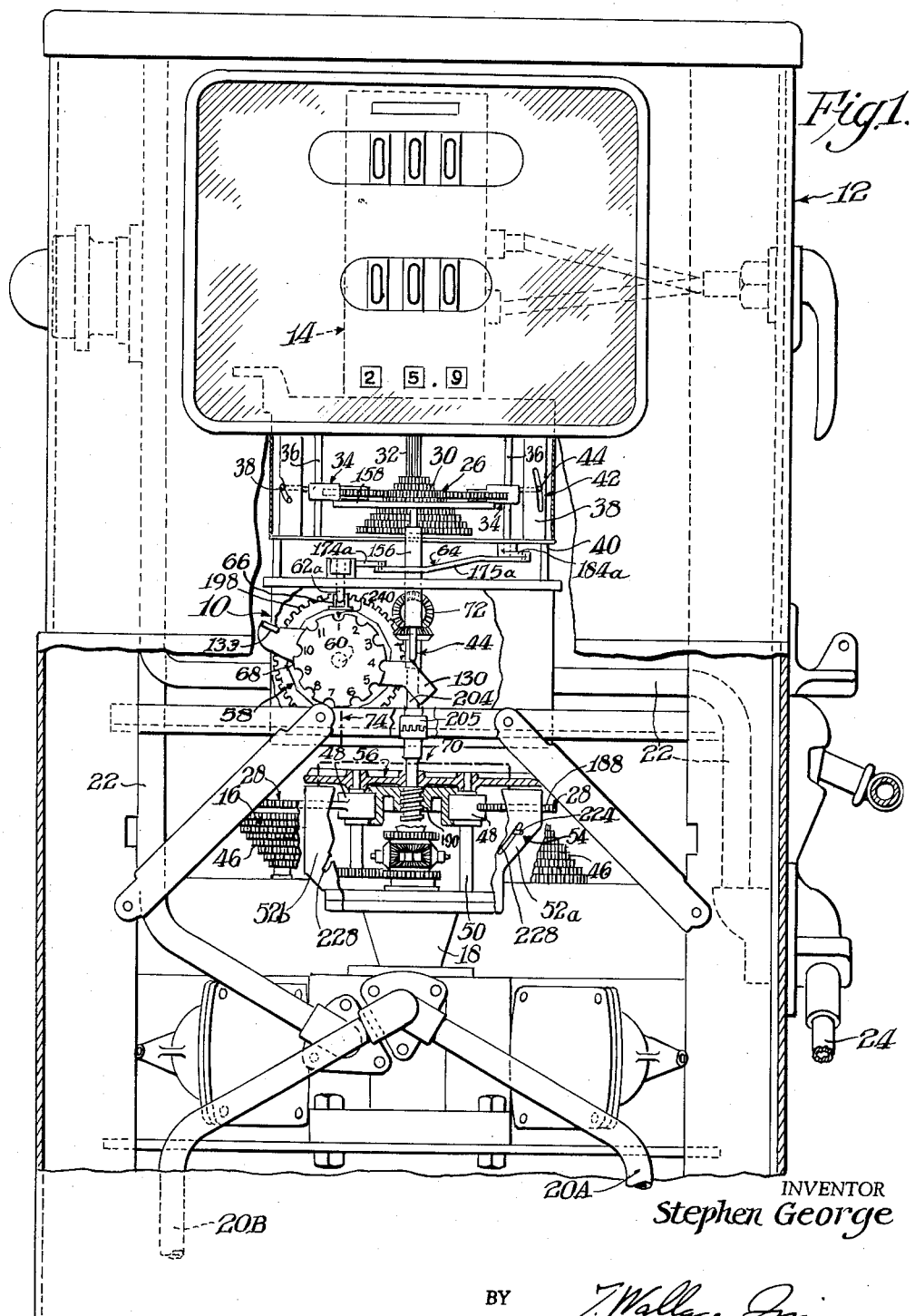
FIG. 1 is a front view in elevation, partially broken away, of an embodiment of this invention as it is installed in a representative unit for blending and dispensing blends of dissimilar fluids.
Figure 6:
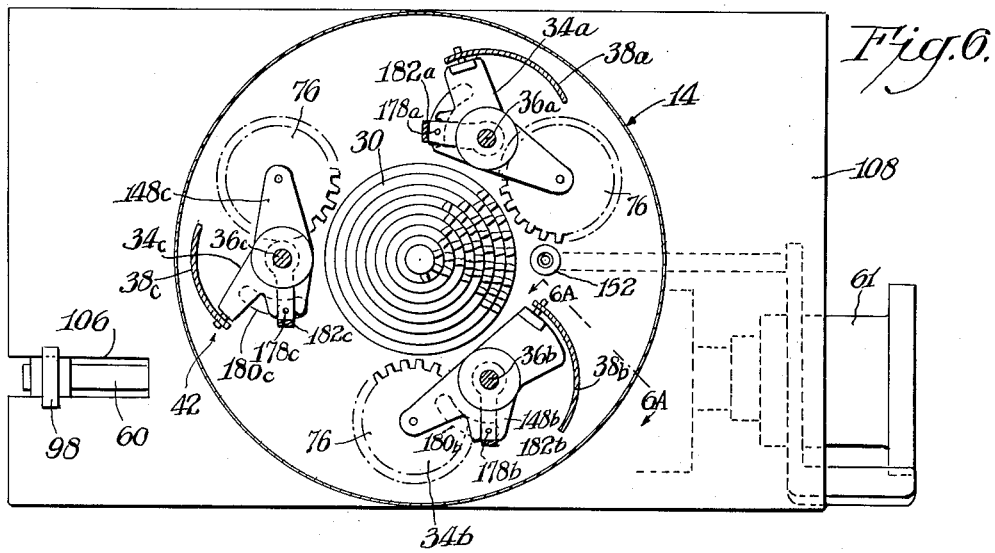
Figure 6A:
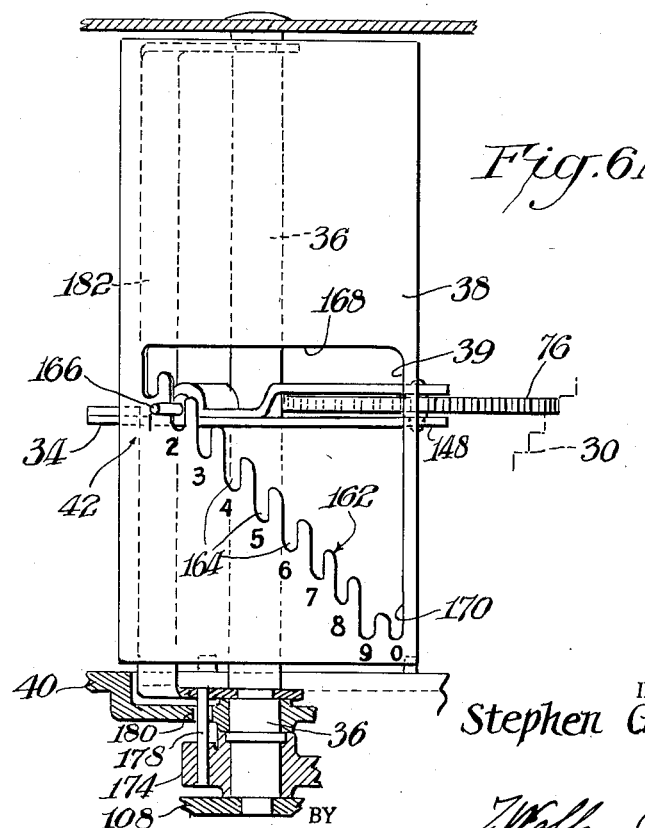
Figure 8:
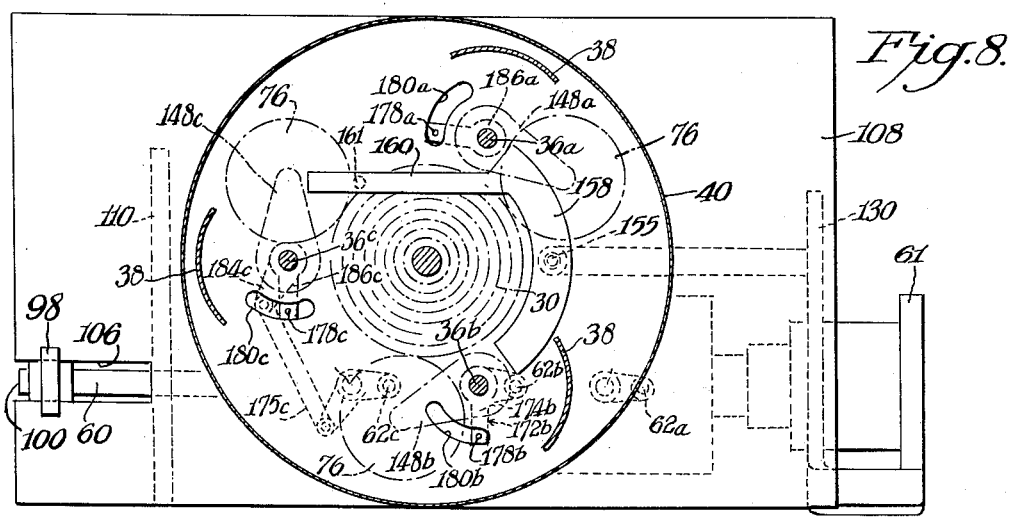
Figure 9:
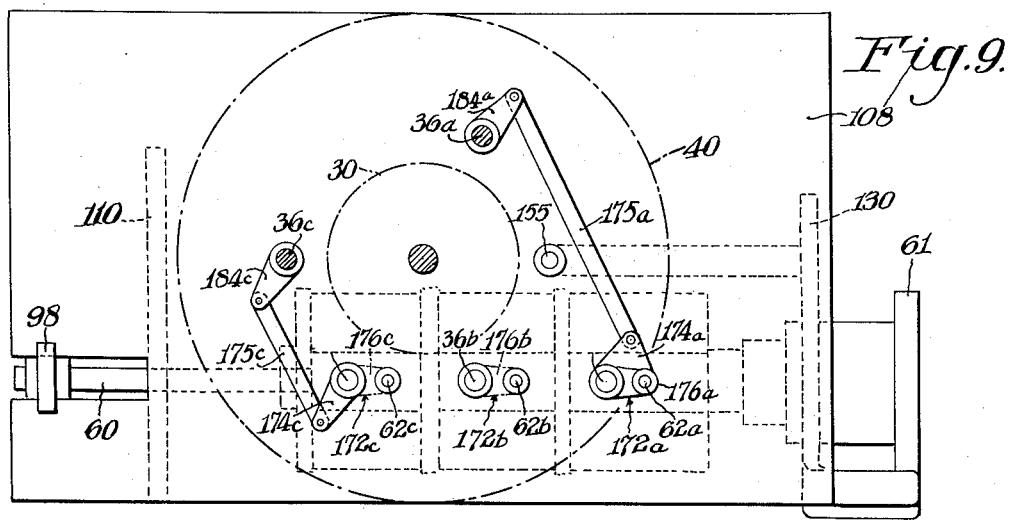
Figure 12:
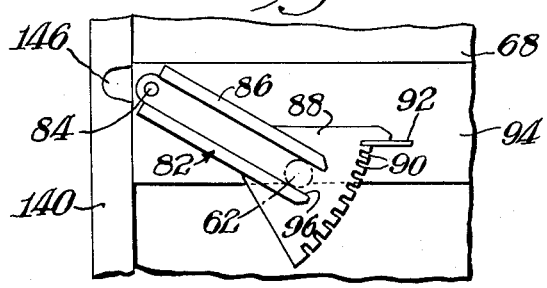

FIGS. 2a and 3 are cross-sectional views taken through FIG. 2 respectively along the lines 2a—2a and 3—3 and looking in the direction of the arrows;

FIG. 4 is similar to FIG. 2 but in another phase of operation;

FIG. 4a is an enlarged view of a portion of FIG. 4;

FIG. 5 is a cross-sectional view taken through FIG. 4 along the line 5—5 and looking in the direction of the arrows;

FIG. 6 is a sectional view taken through FIG. 2 along the line 6—6 and looking in the direction of the arrows;

FIG. 6a is a sectional view taken through FIG. 6 along the line 6a—6a and looking in the direction of the arrows;

FIGS. 7, 8 and 9 are cross-sectional views taken through FIG. 2 respectively along the lines 7—7, 8—8 and 9—9 and looking in the direction of the arrows;

FIG. 10 is a cross-sectional view taken through FIG. 11 along the line 10—10 and looking in the direction of the arrows;

FIG. 11 is a cross-sectional view taken through FIG. 2 along the line 11—11 and looking in the direction of the arrows;

FIG. 11a is a front view in elevation of part of the portion of the embodiment shown in FIG. 11;

FIG. 12 is an enlarged view of a portion of the embodiment shown in FIG. 2;

FIG. 13 is a view in elevation of a modification of a portion of the embodiment shown in FIG. 1;

FIGS. 14 and 15 are cross-sectional views taken through FIG. 13 respectively along the lines 14—14 and 15—15 and looking in the direction of the arrows; and FIG. 16 is a plan view similar to FIG. 15 but in another phase of operation.

*Overall General Description (FIG. 1)*

FIG. 1 is an overall general description of a selector device 10 associated with an apparatus 12 for dispensing a range of predetermined proportional blends of dissimilar fluids, for example, gasolines of dissimilar octane ratings. General reference numbers are used in FIG. 1 and throughout this specification to designate various parts whether or not single or multiple use is made of them. In the following description and in some of the other figures of the drawing, a reference number followed by a letter suffix is used to identify a particular part where multiples of this part are utilized.

Selector device 10 is operatively coordinated with computer 14 and proportion-varying control 16 of dispensing unit 12. Computer 14 is, for example, of the type described in U.S. Letters Patent No. 2,264,557; and proportion-varying control 16 is, for example, part of an apparatus for proportioning and dispensing blends of dissimilar fluids which is disclosed and claimed in copending, commonly assigned patent application, S.N. 659,743, filed May 15, 1957. As described in that copending application, dissimilar fluids, for example, gasolines of different octane ratings, for example, designated as "A" and "B" grades are supplied to proportioning unit 18 through tubes 20a and 20b, and blends of predetermined proportions of "A" and "B" fluids are discharged through tube 22 and subsequently dispensed from unit 12 through, for example, dispensing hose 24.

Computer 14 and proportion-varying control 16 respectively include associated sets of cone and idler gear assemblies 26 and 28. Computer 14 includes, for example, a single centrally disposed cone gear 30, rotatably mounted upon shaft 32. Idler gear carriage assemblies 34, for example, three in number, are rotatably and longitudinally movably mounted upon shafts 36 disposed about the periphery of cone gear 30. Guide means, for example, slotted plates 38 are mounted on the base plate 40 of computer 14 adjacent idler gear carriage assemblies 34. Projection and slot means 42 operatively connect idler gear carriage assemblies 34 with guide means 38 to influence carriage assemblies 34 to move in a path aligned with successive steps of cone gear 30. An actuating means 44 is operatively connected to idler gear carriage assemblies 34 to move them in conjunction with guide plates 38 to engage and disengage idler gear carriage assemblies 34 from cone gear 30.

Cone and idler gear assemblies 28 of proportion-varying control 16 include, for example, two sets of rotatably mounted cone gears 46 and associated idler gear carriage assemblies 48 which are longitudinally and rotatably movably mounted on shafts 50 which are supported upon proportion-varying control 16. Additional guide means, for example, slotted plates 52 are mounted on proportion-varying control 16 adjacent idler gear carriages 48 to help control their movement relative to cone gears 46. Additional projection and slot means 54 operatively connect idler gear carriages 48 with guide means 52. Projection and slot means 54, for example, guide movement of idler gear carriages 48 through a path of movement substantially equidistantly disposed from a line through corresponding elements of additional step cone gears 46, to position assemblies 48 in line with successive steps of cone gears 46.

An additional actuating means 56, for example a lever operated linkage 56, is connected to additional guide means 52 in a manner which permits it to provide an engaging and disengaging rotation of idler gear carriages 48 about shafts 50.

Selector device 10 includes sets of multiple cam and follower means 58 which are associated with selector or control shaft 60 which is, for example, rotatably mounted on dispenser 12, for example, between computer 14 and proportion-varying control 16. In these sets, a cam follower means 62 is operatively connected, for example, by a linkage 64 to each of the idler gear carriage assemblies 34 to permit movement of follower 62 by its associated cam means 66 to move idler gear carriage assemblies 34 in another direction, for example, substantially perpendicular to the direction of movement imparted thereto by actuating means 44 to permit the idler gears to clear the steps of the cone gear during a shift of mesh. This idler carriage assembly movement cooperates with projection and slot means 42 to rotatably align idler gear assemblies 34 with preselected steps of cone gear 30. The expression cone gear is used herein interchangeably with the expression step cone gear for brevity.

Proportion-varying control 16, for example, can be adjusted to eleven different positions to provide eleven different fluids. Multiple cam and follower means 58, therefore includes eleven discrete cam means 66 mounted about the periphery of cylinders 68 corresponding in number to the predetermined number of different blends provided by associated proportion-varying control 16.

Proportion-varying control 16 includes a linear transport means 70, for example, a yoke and jack screw assembly 70, connected to idler gear assemblies 48 by yoke 190 for moving them in a longitudinal direction along shafts 50. Transport means 70 in conjunction with projection and slot means 54 on guide plates 52 moves idler gear carriages 48 along a line substantially equidistantly disposed from corresponding elements of additional cone gears 46. When additional actuating means 56 has moved guide plates 52 to positions disengaging idler gears 48 from cone gears 46, transport means 70 in conjunction with projection and slot means 54 aligns idler gear carriages 48 with predetermined steps of the cone gear corresponding to the predetermined blend to be dispensed. Idler and cone gear assemblies 28 provide the aforementioned eleven modes of engagement for dispensing eleven different proportional blends of "A" and "B" fluids, for example, ranging from pure blends of "A" and "B" alone to proportional blends arranged in regular increments therebetween.

Coordinating means 72, for example, a bevel gear transmission 72 connects linear transport means 70 with selector shaft 60 to permit substantially simultaneous variation of the blend to be dispensed and corresponding setting of the computer. Additional coordinating means 74, for example, a lever operated linkage 74 connects control shaft 60 with additional actuating means 56 to permit disengagement of idler and cone gear assemblies 28 in proportion-varying control 16 by axial movement of control shaft 60 before shifting the ratios provided by these assemblies. After disengagement of idler and cone gear assemblies 26 and 28 by means of actuating means 44 and additional actuating means 56, computer and proportion-varying control idler and cone gear assemblies 26 and 28 are shifted, for example, by rotation of selector shaft 60 to simultaneously vary their ratio settings which substantially selects the particular blend to be dispensed and the unit price and total price setting of the computer corresponding thereto.

*Computer Ratio Selecting Apparatus (FIGS. 2–5 and 12)*

In FIGS. 2 and 4, certain operative elements of selector device 10 are shown in the two separate phases of operation provided when selector knob 61 and connected shaft 60 are positioned in the two different positions respectively shown therein. In FIG. 2, for example, selector knob 61 is shown in its inward or inserted position which, through a train of later described elements, maintains idler gear carriage assemblies 34a, 34b and 34c rotated to angular orientations in which their associated idler gears 76a, 76b and 76c are positioned to engage predetermined steps of neutral cone gear 30. One particular predetermined price setting of computer 14 is thereby provided. Idler carriage assemblies 34a, 34b and 34c are, for example, respectively incorporated in the 1/10 cent, one cent, and ten cent counter subassemblies of computer 14. Selective movement of idler gear carriages 34 and associated idler gears 76 to alignment with other predetermined steps of central cone gear 30 is accomplished, for example, in response to rotation of knob 61 and shaft 60.

Shaft 60 is rotatably mounted in bearings incorporated in vertical plates 78 and 110 which are secured between horizontal plates 108 to form, for example, a structural box 79 which is mounted upon a portion of stationary frame 80 of dispenser 12. Multiple cam and follower assemblies 58a, 58b and 58c are secured, for example, successively in line along shaft 60 and move with it. Sets of multiple cam and follower means 58a, 58b and 58c include multiple cam carriages or cylinders 68a, 68b and 68c. Discrete cam elements 82a, 82b and 82c are mounted about the periphery of respective cylinders 68 in planes substantially parallel to the axes of the cylinders 68 in planes substantially parallel to the axes of the cylinders in the manner shown upon cylinder 68c in FIG. 2. The number of discrete elements or cam tracks 82 upon each cylinder 68 corresponds to the predetermined number of desired variations in ratio setting of computer 14. This desired number is dependent upon the number of different blends controlled by the proportion-varying control 16, for example, eleven blends in all. There are, therefore, eleven cam track means 82 disposed about the periphery of each cylinder 68.

Cam tracks or discrete cam elements 82 are variable in position over a range corresponding to the range of variable engagement of the associated set of cone and idler gears 26. Since the maximum number of discrete variations in engagement between idler gears 76 and cone gear 30 is ten (including an idler gear position disengaged from cone gear 30), each of the cam track means 82 is movable through ten different angular positions about pivot points 84 at which they are secured to cylinders 68. Cam track means 82 include a channel or trough-shaped element 86 pivoted at one end thereof at 84 to cylinder 68 (as shown in detail in FIG. 12). The other end of cam track means 82 is adjustably secured to the corresponding surface of cylinder 68 by means of a serrated fan 88 including ten notches 90 which are optionally engaged, for example, by a leaf spring detent means 92 mounted on the corresponding surface 94 of cylinder 68. Surface 94 upon which cam track means 82 are mounted are made flat, for example, to facilitate the attachment of and to guide the movement of cam track means 82 relative thereto. This results in cylinders or carriages 68 being shaped as polygonal solids having parallel sides rather than as cylinders, but the term cylinder is used as a term generally descriptive of their rotational function.

Cam track means 82, are accordingly, adjustable to predetermined angles corresponding to the predetermined angular orientations of corresponding idler gear carriages 34 for engaging idler gears 76 with the predetermined steps of cone gear 30 associated with the price setting blend provided at the preselected angular orientation of knob 61. In FIG. 2, follower means 62a, 62b and 62c are shown in their engaged positions or at positions adjacent ends 96 of cam track means 82 remote from pivot 84 which is disposed at a neutral position as is later described in detail. This causes engaged follower means 62a, 62b and 62c to be respectively maintained at angles engaging associated idler gears 76a, 76b and 76c with predetermined steps of cone gear 30 when shaft 60 is in the longitudinal position shown in FIG. 2. In setting up selector device 10, cam track means 82 for each of the eleven angular orientations of shaft 60 are positioned at angles engaging idler gears 76 with steps of cone gear 30 thereby providing a predetermined unit and total price ratio setting for computer 14 which corresponds to the blend selected at that same angular orientation of shaft 60.

*Actuating Means for Disengaging Cone and Idler Gears (FIGS. 2–4)*

In FIG. 2 is also shown coordinating means 74, which disengages idler gear and cone assemblies 28 in proportion-varying control 16, and its mode of connection to selector shaft 60. Coordinating means 74 includes a rod 98 rotatably secured, for example, by retaining rings 102 and 104 disposed in suitable recesses in shaft 60. Rod 98 is guided and prevented from rotating in its longitudinal path of movement with shaft 60 by insertion within slots 106 in upper and lower structural plates 108.

Rod 98 is connected through connecting lever or link 112 and additional links to guide means 52 of proportion-varying control 16 as is shown and later described in detail with reference to FIGS. 10 and 11. Guide means or plates 52 are thereby moved to engage and disengage idler gear carriages 48 from predetermined steps of cone gears 46. In FIG. 2, guide means 52 is shown in the position which it assumes when idler gears 48 are engaged with predetermined steps of the cone gears 46. Guide means 52 is accordingly rotatably mounted upon the axis of rotation of an idler gear carriage assembly shaft 50 by means of horizontal extensions 208 and 116 disposed, for example, above and below shaft 50. The manner in which its engaging and disengaging movement is accomplished is later described in detail in conjunction with FIGS. 10 and 11.

In FIG. 4 is shown the longitudinal position of control knob 61 and associated shaft 60 in which additional actuating means 56 operates to disengage idler carriage assemblies 48 from cone gears 46. When shaft 60 is pulled out to the position shown in FIG. 4, a curved key 118 mounted to slide within a longitudinally disposed slot 120 having a curved cross-sectional shape and disposed in auxiliary vertical bar 122 mounted between plates 108, for example, is driven forward by contact with the forward moving face 124 of cylinder 68a. This drives the body 126 of key 118 into engagement with circular slot 128 within disengaging lever 130 as shown in FIGS. 2 and 3. Key 118 is maintained inserted within slot 120 by means of a pin 131 inserted in walls of bar 122 adjacent slot 120 and passing through a longitudinal slot 134 within body 126 which is long enough to allow operative longitudinal movement of key 118.

Before shaft 60 is pulled outwardly from the position shown in FIG. 2 to the position shown in FIG. 4, actuating or disengaging lever 130 must be first rotated to an angular orientation in which its slot 128 is positioned directly in front of the arc-shaped body 126 of key 118. This permits the arc-shaped body 126 of key 118 to enter slot 128 in actuating lever 130 which allows shaft 60 and associated cylinder 68 to move into the extreme outward position shown in FIG. 4. If actuating lever 130 has not been depressed to the full position indicated in full line in FIG. 3, a blank portion of the hub 132 of actuating lever 130 is disposed in front of the body 126 of key 118 thereby preventing cylinder 68a and shaft 60 from being withdrawn to the fully extended or withdrawn position shown in FIG. 4. After lever 130 has been rotated to the full line or disengaging position shown in FIG. 3, and shaft 60 withdrawn as shown in FIG. 4, the inserted body 126 of key 118 maintains lever 130 in the disengaged position as long as shaft 60 and knob 61 are fully withdrawn. Rotatable movement of lever 130 is permitted in the operative phase shown in FIG. 2 because only the narrow nose 135 of key 118 extends within the arcuate cutout 128 in lever 130. This provides an interlock between actuating lever 130 and control shaft 60 which permits shaft 60 to be fully withdrawn only after lever 130 is actuated and lever 130 to be released only when shaft 60 is reinserted.

After shaft 60 and control knob 61 have been fully withdrawn to the position shown in FIG. 4, splines 136 adjacent control knob 61 are withdrawn from correspondingly splined hole 138 in auxiliary bar 122 which thereby frees knob 61 and shaft 60 for rotation.

Another event that occurs when shaft 60 is longitudinally moved from the position shown in FIG. 2 to the position shown in FIG. 4, is a longitudinal movement of retaining means 140a, 140b and 140c respectively connected behind cylinders 68a, 68b and 68c. Retaining means 140a, 140b and 140c are longitudinally secured to shaft 60 by retention between cylinders 68 and a retaining ring 142, for example, projecting from a suitable recess in shaft 60 behind retaining means 140c, but shaft 60 is free to rotate relative to them. The lower ends of retaining means 140 are disposed within slots 144 formed in lower plate 108 of box structure 79. The upper ends 146 of retaining means 140, as shown in FIGS. 2, 4 and 12, are formed as channels 146 which receive and retain followers 62 when shaft 60 and attached retaining means are withdrawn to the position shown in FIG. 4. Followers 62 are shown in FIG. 4 after movement through the neutrally positioned and pivoted ends of cam track means 82 to nest them within channeled ends 146 of retaining means 140. This maintains followers 62 in a neutral position while shaft 60 is rotated to position a new predetermined set of cam track means 82 in position to engage and angularly orient followers 62 upon reinsertion of knob 61 to the position shown in FIG. 2. In FIG. 4, coordinating linkage 74 and link 112 are shown in the condition where they rotate guide means 52 to a position disengaging associated idler gear carriages 48 from cone gears 46 (as is later described in detail in conjunction with FIGS. 10 and 11).

*Computer Gear Disengaging Apparatus (FIGS. 6–9)*

FIGS. 6–9 are sectional views taken through FIG. 2 along corresponding cutting lines to illustrate details of cone and idler gear assemblies 26, guide means 38, and associated slot and projection means 42. These figures also show details of actuating linkage 44 which disengages idler gears 76 from cone gear 30 to permit carriages 148 of idler gear carriage assemblies 34 to be rotated to angular orientations provided by a preselected longitudinally aligned set of cam track means 82 acting in conjunction with projection and slot means 42.

In FIG. 7, actuating lever 130 including thumb projection 133 is shown in the undepressed position in which its rearwardly extending arm or projection 150 is out of contact with vertically mounted reciprocating rod 152 which is mounted to slide upward and downward, for example, in a vertical bearing 154 secured to horizontal structural plate 108. Rod 155 is mounted in line with and above rod 152 in a bearing 156 mounted upon base plate 40 of computer 14. The adjacent ends of rods 152 and 155 are joined, for example, by a coil spring 157 which maintains an upwardly directed resilient force acting upon rod 155 so long as lever 130 is maintained depressed. The portion of rod 155 extending upwardly beyond bearing brace 40 is connected to curved segment 158 as shown in FIG. 8. Segment 158 underlies idler gear carriage assemblies 148a and 148b to provide a means for lifting them upward to the upper limit of travel permitted by projection and slot means 42 as indicated in FIG. 6a. An extension 160 projects rearwardly from segment 158 to a position in which its end underlies idler gear carriage assembly 148c to provide means for raising it also to a position corresponding to that shown in FIG. 6a. A reciprocating rod 161 inserted within a suitable bearing is attached to extension 160 to guide it in its upward and downward motion.

FIG. 6a shows a guide means 38, for example, of the general kind used in a computer of the type described in U.S. Letters Patent 2,264,557. Plate 38 includes a slot 39 whose lower surface 162 is serrated by recesses or slots 164 for receiving projection means 166 attached to respective carriages 148. When projection means 166 is disposed within each of recesses 164, it is angularly and vertically aligned to engage its idler gear 76 with a predetermined step of cone gear 30. The upper or opposite surface 168 of slot 39 is smoothly disposed, for example, in a horizontal direction to guide projection 166 to positions in which idler gears 76 are aligned with selected steps of cone gear 30. When actuating lever 130 is depressed to raise carriages 148 to a position in which projections 166 rise out of recesses 164, carriages 148 can thereafter be rotated to positions in which projections 166 are aligned with any desired recess 164 corresponding to any preselected step of cone gear 30.

After carriages 148 and projections 166 have been raised out of recesses 164, subsequent withdrawal of shaft 60 positions followers 62 in the neutral position within retaining means 140 which accordingly drives all of projecting pins 166 to a corresponding neutral position which, for example, is the right hand end 170 of slot 39. When pins 166 are at end 170, for example, idler gears 76 are disengaged from cone gear 30. When a new preselected longitudinal set of cam tracks are positioned in front of follower 62 by rotation of control shaft 60, and control shaft 60 is reinserted to the position shown in FIG. 2, idler gear carriages 148 are rotated to angular positions in which projections 166 are aligned with predetermined recesses 164 of slots 39 corresponding to a new set of predetermined steps of cone gear 30. Subsequent release of actuating lever 130 simultaneously permits projections 166 to drop into aligned recesses 164 and idler gears 76 to engage the predetermined steps of cone gear 30 to provide the selected ratio setting of the computer corresponding to the particular blend of fluid selected.

*Computer Idler Gear Shifting Apparatus*

In FIGS. 6–9 the operating linkage from cam followers 62 to idler carriages 48 is shown in various sectional, elevational and plan views. Followers 62a, 62b and 62c are respectively mounted within follower lever arm elements 172a, 172b and 172c which are shown in elevation in FIGS. 2 and 4 and in plan in FIG. 9. Follower lever arm element 172b includes an upper arm 174b (FIG. 8) extending, for example, at right angles to lower arm 176b (FIG. 9) within which follower pin 62b is mounted. As shown in FIGS. 7 and 8, rod 178b extends upwardly from arm 174b through slot 180b in base plate 40 into engagement with yoke 182b which is pivoted about computer idler carriage shaft 36b. As lever element 172b is rotated by virtue of longitudinal relative movement of cam track 82, a rotational movement is produced through arm 174b, rod 178b and yoke 182b which causes idler carriage 148b, in conjunction with projection and slot means 42b as previously described, to rotate a predetermined angular orientation for engaging idler 76b with a predetermined step of cone gear 30.

A similar rotational movement is imparted to idler carriage 148a, as shown in FIGS. 8 and 9, by a similar lever element 172a including lower arm 176a within which follower pin 62a is mounted and a laterally extending arm 174a (FIG. 9) which is connected by a linking arm 175a to an auxiliary lower arm 184a (FIG. 9) which is rotatably mounted below computer base 40. Auxiliary lower arm 184a is connected to an upper arm 186a (FIG. 8) supporting a rod 178a extending through slot 180a in computer base 40. Rod 178a is connected to yoke 182a which is rotatably mounted about shaft 36a as shown in FIG. 7.

In a similar fashion, lever element 172c includes a lower arm 176c within which follower pin 62c is mounted and a laterally extending arm 174c (FIG. 9) which is connected to auxiliary arm 184c through a connecting link 175c as is also shown in FIG. 9. An upper arm 186c (FIG. 8) is directly connected to arm 184c and includes a rod 178c extending through slot 180c in computer base 40 to connect upper arm 186c to yoke 182c which is attached to computer idler carriage 148c to impart rotation thereto.

*Ratio Varying Control Gear Shifting Apparatus (FIGS. 7, 10 and 11)*

In FIGS. 7, 10 and 11 are shown the means for shifting idler carriage assemblies 48 longitudinally or linearly relative to proportion-varying control cone gears 46. Actuating means for imparting rotational movement to idler carriages 48 about shafts 50 to engage and disengage idler gears 188 from cone gears 46 are later described in conjunction with FIGS. 10 and 11.

Linear transport means 70 for moving yoke 190 carrying idler carriage assemblies 48 up and down includes an internally threaded nut 192, for example, ⅝ inch in inside diameter with eight threads per inch in triple lead. A similarly threaded jack screw 194, rotatably mounted in bearing 196 secured to a stationary portion of the proportion-varying control, is engaged within internally threaded nut 192 to impart longitudinal movement thereto. Rotational motion is imparted to jack screw 194 by a bevel gear transmission or coordinating means 72 which connects jack screw 194 to control shaft 60. As shown in FIG. 4, a spur gear 198 is secured upon shaft 60 and is engaged with an elongated pinion gear 200 rotatably mounted, for example, in a position parallel to shaft 60 between vertical bars 110 and 203 which are attached to supporting elements 108 of the structure 79 supporting 60. Bar 203 merely depends a short distance from upper plate 108 to provide a space below it for pinion 200 which is connected through a bevel gear linkage 202 to vertical shaft 204. Shaft 204 is connected to jack screw 194 by coupling 205, for example.

As control knob 61 and control shaft 60 are rotated, a corresponding rotational movement is imparted by transmission 72 to jack screw 194 which raises and lowers yoke 190 and idler gear carriages 48 a predetermined amount which is sufficient to move it to successive predetermined steps of cone gears 46. The ratios in the gear transmission, for example, may be chosen to move idler gear carriages upward and downward a height, for example, of .218 inch for each increment of rotation of shaft 60 which is sufficient to move idler gears 188 from one step of cone gear 46 to the next when the steps are of corresponding thickness.

*Proportion-Varying Control Gear Disengaging Apparatus (FIGS. 10 and 11)*

Actuating linkage 56 for imparting rotational movement to guide means 52 for disengaging cone and idler gear assemblies 28 is shown in detail in FIGS. 10 and 11. While rod 98 is longitudinally moved back and forth with control shaft 60, it imparts a rotational movement to link 112 attached thereto as shown in FIGS. 2 and 4. FIG. 10 shows how link 112 is connected by pin 207 to intermediate arm 206 which itself is rotatably mounted about the axis of rotation of an idler gear shaft 50a. Intermediate arm 206 includes an extension 208 which connects arm 206 to the top of guide means 52 to impart a rotational movement thereto which is transmitted to idler carriage 48a through projection and slot means 42a to rotate idler gear 188a inwardly and away from associated cone gear 46a to disengage it therefrom.

Intermediate arm 206 is also connected by means of pin 210 to underlying connecting link 212 which includes an elongated slot 214 through which jack screw 194 passes. A corresponding slot 216 is provided in intermediate arm 206. Connecting link 212 is in turn connected by pin 218 to underlying arm 220 which is rotatably mounted about idler carriage shaft 50b. Arm 220 is connected to the top of guide means 52b. As guide means 52a is rotated inwardly, guide means 52b is concurrently inwardly rotated to disengage idler gear 188b from cone gear 46b.

A pair of pick-off guide plates 222a and 222b, shown in FIG. 11a, are stationarily mounted in back of guide means 52 adjacent the path of travel of projections 224a and 224b of projection and slot means 42a and 42b. As shown in FIGS. 2, 4, 11 and 11a, pick-off guides 222 each include a step-shaped surface 226 which substantially corresponds to the configuration of the associated cone gear 46. Projection 224 nests within each of the steps 227 provided by stepped surface 226. The corresponding idler gear 188 is thereby properly aligned to engage a predetermined step of cone gear 46.

Pick-off guides 222 are attached to a stationary portion of proportion-varying control 16 by stationary upper plates 230a and 230b and lower plates 232a and 232b (FIGS. 2 and 4). As shown in FIG. 10, upper plate 230a includes a lateral extension 234 whose end 236 is hardened and bent upward to form a stop for limiting the rotational travel of lever 206.

As control shaft 60 is longitudinally moved backward and forward, guide means 52a and 52b rotate inwardly towards each other to disengage idler gears 188a and 188b from cone gears 46a and 46b. Rotational movement of jack screw 194 in response to rotation of control shaft 60 then raises or lowers yoke 190 and idler carriage assemblies 48 to vertically position idler gears 188 in line with another predetermined step of cone gear 46 to provide the desired proportioning ratio. Projections 224 are guided within slots 228 of guide means 52 to positions in line with the new predetermined steps of cone gears 46 a distance away from these steps which permits engagement when guide means 52a and 52b are rotated outwardly when control knob 61 is reinserted. Spring 238 reacts between extension 208 of lever 206 in a direction to urge idler gears 188 into engagement with cone gears 46. The teeth of gears 188 and 46 are pointed, for example, to insure their meshing despite any misalignment which might occur when they are engaged. Step-shaped surface 226 insures precise engagement of idler carriages 48 and idler gears 188 with corresponding steps of cone gears 46a and 46b.

*Summary of Operation*

In the following are set forth the successive acts which selector device 10 performs in conditioning computer 14 and proportion-varying control 16 to dispense and compute the cost of a particular one of the range of eleven blends, for example, which unit 12 is capable of dispensing.

Before device 10 is ready for operation, multiple cam and follower means 58 are preset by varying the angular positions of cam tracks 82 to provide a price setting of computer 14 corresponding to the particular blend provided by proportion-varying control 16 at each indexed angular orientation of control shaft 16. The flexibility of adjustments of multiple cam and follower means 58 permits the ratio controls of computer 14 to be optionally set to provide any arbitrary price setting for computer 14 for each of the eleven blends. It is most probable, however, that the blends between pure blends of "A" and "B" fluids will be priced in accordance with the proportional amounts of "A" and "B" fluids included therein, but this principle need not be strictly followed.

Once cam tracks 82 of multiple cam and follower means 58 have been preset, selector unit 10 is ready for operation by a simple combination of movements of actuating lever 130 and control knob 61. Assuming, for example, that a motorist desires a blend of gasoline different from that which gasoline dispenser 12 has previously provided, the attendant first depresses actuating lever 130 by thumb pressure on projection 133. This raises idler gear carriages 34 until their projections 166 strike the upper smooth surface 168 of slots 39 in slotted plates 38 mounted upon computer base 40 adjacent idler gear carriages 34.

Curved slot 128 in the hub 132 of lever 130 is now positioned in line with curved body 126 of key 118. It is then possible to fully withdraw or longitudinally move knob 61 and control shaft 60 from the operative position shown in FIG. 2 to the shifting position shown in FIG. 4. The forward moving face 124 of multiple cam carriage 68a drives body 118 into engagement with slot 128 of lever 130 thereby locking lever 130 in the disengaging position. When control knob 61 is fully withdrawn to the position shown in FIG. 4, its splines 136 are removed from hole 138 in stationary bar 122 which accordingly frees knob 61 for rotation.

When knob 61 and shaft 60 are longitudinally moved to the position shown in FIG. 4, coordinating means 74 and additional actuating linkage 56 connecting shaft 60 with guide plates 52 of proportion-varying control 16 cause guide plates 52 to rotate inwardly towards each other thereby disengaging idler gear assemblies 48 from associated cone gears 46. This disengaging action is accomplished through rod 98 connected to the end of shaft 60 remote from knob 61, lever 112, and additional linkages 56 shown in detail in FIG. 10. Lever 112 is directly connected to intermediate arm or lever 206 which has an extension 208 attached to the top of guide plate 52a. Intermediate arm 206 is also connected to guide plate 52b through pivoted links 212 and 220. Link 220 is connected to the top of guide plate 52b to impart rotational movement thereto. Intermediate arm 206 moves under the influence of lever 112 until its side strikes stationary stop surface 236.

When linkage 56 is in the position shown in FIG. 10, guide plates 52a and 52b are rotated inwardly towards each other a distance sufficient to rotate idler carriages 48 through the action of slots 228 in plates 52 on projections 224 attached to idler gear carriages 48 an angular distance sufficient to disengage idler gears 188 from cone gears 46.

Also, as control knob 61 is withdrawn to the position shown in FIG. 4, cylinders 68 move longitudinally together with it which shifts cam tracks 82 relative to followers 62. This moves followers 62 out of engagement with cam tracks 82 through the neutral or pinned ends of cam tracks 82 into engagement with channelled ends 146 of retaining means 42 which move longitudinally together with cylinders 68. This rotates idler gear carriages 34 to a neutral position and projections 166 are, accordingly, guided along upper smooth surface 168 (FIG. 6a) of slots 39 in computer guide plates 38 to a corresponding neutral position. This neutral position of projection 166 is, for example, the lowermost end 170 of slots 39 where, for example, computer idler gears 76 are disengaged from cone gear 30.

Knob 61 is then rotated to shift the gear ratios of computer 14 and proportion-varying control 16. A pointer 240 (FIG. 1), for example, is secured to dispenser 12 adjacent hub 61. This pointer 240 moves across indicia in knob 61 designating the particular blend of fluid desired. Any convenient scheme for designating the particular blends dispensed can be utilized because the price of the selected blend automatically appears on the price indicator of the standard computer used in this device. Numbers from one to eleven are, for example, marked on knob 61 (FIG. 1). Any arbitrary pricing scheme can be utilized for the range of blends, but a simple scheme is described in the following for illustrative purposes: If the "A" fluid is priced at twenty cents per gallon and the "B" fluid is priced at thirty-one cents per gallon, the intermediate blends may be successively priced at intermediate prices successively arranged between twenty and thirty-one cents per gallon.

If the motorist requests an intermediate blend, for example, priced at twenty-five cents per gallon, control knob 61 is rotated to position pointer 240 at marking No. 6 on knob 61. This simultaneously adjusts idler gear 48 opposite the step of cone gear 46 which provides this particular blend and adjusts the set of cam tracks 82 in line with the set of followers 62 which orients idler gears 34 of computer 14 in line with the twenty-five cent per gallon steps of cone gear 30. At the same time, the twenty-five cent per gallon price automatically appears on the face of computer 14.

As the pointer on control knob 61 is rotated in line with the requested blend, the rotational motion of shaft 60 is transmitted to idler gear carriages 48 in proportion-varying control 16 through gear 198 mounted on shaft 60, elongated pinion 200, bevel gear transmission 202, shaft 204, coupling 205, jack screw 194 and yoke 190. The ratios of the various parts of coordinating transmission 72 and 74 and jack screw 194 are selected to selectively position idler gears 188 directly in line with a predetermined step of cone gears 46, for example, the steps providing a blend of "A" and "B" fluids which is worth twenty-five cents per gallon.

Control knob 61 is then reinserted or longitudinally moved from the position shown in FIG. 4 to that shown in FIG. 2. This reinserts followers 62 into the new set of cam tracks which rotate idler gear carriages 34 to angular orientations which position projections 166 against portions of smooth surfaces 168 of slots 39 immediately overlying notches 164 in lower surfaces 162. These particular notches 164 will later precisely engage idler gear 76 with the predetermined set of steps of cone gear 30 which set computer 14 to the twenty-five cents per gallon price setting.

As soon as knob 61 arrives at the fully inserted position shown in FIG. 2, the body 126 of key 118 moves out of engagement with lever 130 which permits it to rotate to the disengaged position. This drops segment 158 and extension 160 (FIG. 8) which permits idler gear carriage assemblies 34 to move downward and permit their projections 166 to drop into the predetermined notches 164 lying beneath them. Idler gears 76 are thereby engaged with the predetermined set of steps of cone gear 30 providing the twenty-five cents per gallon ratio setting.

The reinserting longitudinal movement of knob 61 is also transmitted through shaft 60, rod 98, link 112 and the linkage 56 shown in FIG. 10 to rotate guide plates 52a and 52b away from each other. This engages proportion-varying control idler gears 188 with the predetermined steps of cone gears 46 providing the twenty-five cents per gallon blend. The reengaging movement of guide plates 52a and 52b is assisted by spring 238 which reacts upon intermediate arm 206. Precise positioning of idler carriages 48 is accomplished by engagement of projections 224 in predetermined steps 227 of step-shaped surface 226 of stationary pick-off guides 222 which are mounted behind guide plates 52.

Selecting device 10 has thereby conditioned proportion-varying control 16 and computer 14 to provide the particular blend of fluid requested and to correctly calculate the cost of the amount of this fluid dispensed. It has been demonstrated how all of these functions are accomplished by simple straight-forward movements of actuating lever 130 and control knob 61. Another advantage of device 10 is that the exact price of the fluid to be dispensed automatically appears on the face of the computer in full view of the purchaser.

*Modification of Proportion-Varying Control Gear Disengaging Apparatus (FIGS. 13–16)*

The modification shown in FIGS. 13–16 permits independent movement of idler gear carriage assemblies 348a and b in response to longitudinal or axial motion of control shaft 360 to insure that both idler gears 388a and b mesh properly with cone gears 346a and b upon re-engagement. Additional actuating means 356 for influencing the rotational movement of idler gear carriage assemblies 348 includes camming plates 330a and b rotatably mounted about the axes of rotation of idler gear carriage shafts 350a and b. These plates are respectively connected to slotted plates 352a and b which respectively engage projections 324a and b in a similar manner to that shown in FIG. 11.

Camming plate 330a is, for example, L-shaped and includes an extension 335 which is upwardly bent at 334 to permit its end 337 to overlie the adjacent end 339 of camming plate 330b. Camming surfaces 336 and 341 are respectively provided on extensions 335 and 339 which surfaces are contacted by an actuating pin 343 when it moves in the direction designated by arrow 345 to influence rotation of camming plates 330a and b towards each other to disengage idler gears 338a and b from respective cone gears 346a and b. A tension spring 338 reacts between camming plates 330a and b in a direction to maintain idler gears 388a and b engaged with aligned steps 347a and b of cone gears 346a and b.

FIG. 15 shows the aforementioned parts with camming surfaces 336 and 341 free from contact with pin 343. Idler gears 388a and b are, accordingly, engaged with respective steps 347a and b of respective cone gears 346a and b.

In FIG. 16, pin 343 has moved from the position indicated therein in broken outline to the position shown in full outline along the line indicated by arrow 345. Pin 343 has accordingly reacted against camming surfaces 336 and 341 to disengage idler gears 388a and b from aligned steps 347a and b of cone gears 346a and b.

In FIGS. 13 and 14 are shown the elements which influence the movement of pin 343 in the direction indicated by arrow 345 to influence engagement and disengagement of idler gears 388a and b from the aligned steps of cone gears 346a and b. Pin 343 is an extension of arm 398 which is rotatably mounted upon shaft 360 by means of a collar 342. Pin 343 is held, for example, in a vertical orientation by insertion through a longitudinal slot 306 in lower plate 308 of box structure 379 supporting control shaft 360, cylinders 368a, b, c, and other auxiliary parts (not shown). Only so much of parts already described in detail are shown to indicate how parts special to this modification are associated therewith.

As pin 343 and arm 398 move longitudinally back and forth with control shaft 360, camming plates 330a and b are urged by sliding contact with pin 343 from the position shown in FIG. 15 to the position shown in FIG. 16. This actuates simultaneous but independent disengagement and re-engagement of idler gears 388a and b with aligned steps 347a and b of cone gears 346a and b. When pin 343 moves back to the control position shown in FIG. 15, idler gears 388a and b are allowed to independently seek proper meshing alignment with respective aligned steps 347a and b of cone gears 346a and b. Any misalignment which may occur can, therefore, be independently absorbed by each of the cone and idler gear assemblies 328a and b even when conventional gear tooth forms are utilized. If the respective engaging gears should abut instead of meshing, this abutment will be cured as soon as the cone gears start to rotate and the idler gears independently drop into proper mesh with them.

This application is a continuation of application Serial No. 712,206 filed January 30, 1958, now abandoned.

What is claimed is:

1. A device for permitting the convenient presetting of a quantity and price computer, said computer including associated cone and idler gear assemblies rotatably mounted upon parallel shafts, said idler gear assemblies including carriages which are rotatably and longitudinally movable about their associated shafts, said device comprising sets of multiple cam and follower means operatively associated with each of said sets of cone and idler gear assemblies, each of said multiple cam means including discrete elements corresponding in number to a predetermined number of variations of said computer, said discrete elements being variable over a range corresponding to the range of variable engagement of said associated sets of cone and idler gear assemblies, the follower means of each of said sets of multiple cam and follower means being operatively associated with said idler gear carriages of said associated set of cone and idler gears to permit said cam and follower means to move said carriage to one plane of movement, selector means associated with said multiple cam and follower means for optionally connecting a preselected one of said discrete elements of said multiple cam and follower means to said associated set of cone and idler gears, guide means mounted upon said computer adjacent said idler gear carriages, projection and slot means connecting said idler gear carriages with said guide means to permit said guide means to influence said idler gear carriages to move in a path aligned with successive steps of said cone gears, actuating means operatively connected to said idler gear carriages for moving said carriages in another plane of movement, said guide means being constructed and arranged to permit limited movement of said idler gear carriages in both of said planes of movement to permit and control the engaging and disengaging movements of said idler gears and movement of said idler gears when disengaged to positions in line with selected steps of said cone gears, said multiple cam and follower means being constructed and arranged to rotate said idler carriages, said actuating means being constructed and arranged to move said carriages longitudinally along said shafts, said projection and slot means being constructed and arranged to permit said longitudinal movement of said actuating means to disengage said idler gears from an aligned step of said cone gears, one surface of said slot means including recesses for positioning said idler gears in engagement with steps of said cone gears, the opposite surface of said guide means being smoothly disposed in a direction substantially parallel to a line through corresponding elements of said steps of said cone gears and far enough away therefrom to guide said projection means to positions in which said idler gears are disengaged and aligned with selected steps of said cone gears, said multiple cam and follower means including a rotatable cylinder corresponding to each of said cone and idler gear assemblies, cam track means being substantially longitudinally disposed about the periphery of said cylinders in planes substantially parallel to the axes of said cylinders, one of said cam track means being provided upon each of said cylinders for each of said predetermined number of variations of said computer, one end of each of said cam track means being disposed to position said idler gear carriages in a corresponding neutral position, a remote portion of each of said cam track means being disposable in a position to engage said idler gears with a predetermined step of said cone gears, said cylinders being mounted upon said computer in a manner permitting their longitudinal movement, said longitudinal movement of said cylinders being sufficient to move said cam tracks relative to said followers from said remote position to a position in which said followers are disengaged from said cam tracks through said end of said cam tracks disposed at said neutral position, and retaining means being mounted to move longitudinally with and adjacent said neutral positions of said cylinders for grasping said cam followers when they are disengaged from said cam tracks for maintaining said followers in said neutral positions while said cylinders are rotated to another preselected angle of rotation.

2. A device as set forth in claim 1 wherein said cylinders are mounted in line upon a single control shaft, said actuating means is comprised of a projecting means and associated manually-actuable linkage for moving said idler gear carriages longitudinally along their shafts to disengage said idler gears from a step of said cone gears.

3. A device as set forth in claim 2 wherein said manually operable linkage includes a lever means rotatably mounted upon said control shaft, interlocking means operatively connects said lever with said control shaft to permit said control shaft to be longitudinally moved from its operative position only when said lever is actuated to disengage said idler gears from said cone gears, and said interlocking means permitting said lever to be moved to reengage said idler gears with said cone gears only when said control shaft is moved back to its operative position.

4. A device as set forth in claim 1 wherein said cam track means are rotatably mounted upon said cylinders in planes parallel to the axes of said cylinders to permit their angular orientations to be adjusted to provide variable rotational movements of said idler carriage assemblies and variable settings of said computer corresponding to each predetermined angular station of said control shaft.

5. In an apparatus for dispensing a range of predetermined proportional blends of dissimilar fluids including a single quantity and price computer incorporating sets of idler carriage and cone gears assemblies mounted upon parallel shafts and a proportion-varying control including additional associated sets of cone and idler carriage and cone gear assemblies mounted upon parallel shafts, a selector device for permitting the convenient selection of the price setting of said computer corresponding to a preselected proportional blend, said device comprising the combination set forth in claim 1, additional guide means mounted adjacent said additional idler carriages, additional projection and slot means connecting said additional idler gear carriages with said additional guide means to permit said additional guide means to govern the movement of said additional idler gear carriages from one step to another of said additional cone gears, linear transport means operatively associated with said additional carriages for moving said additional carriages in a longitudinal direction along their shafts, said additional slots being disposed in a path substantially equidistantly disposed from a line through corresponding elements of said additional cone gears to guide the movement of said additional idler gears to positions in line with said steps of said additional cone gears, said additional guide means being movably mounted to cause rotation of said additional idler gear carriages about their shafts for disengaging said additional idler gears from said additional cone gears, additional actuating means are connected to said additional guide means for moving said additional guide means in a direction to disengage said additional idler gears from said additional cone gears, and coordinating means operatively connecting said selector means associated with said multiple cam and follower means with said linear transport means to permit the price setting corresponding to each of said predetermined blends which are selected by said proportion-varying control to be conveniently set into said computer as each of said predetermined blends is selected.

6. A device as set forth in claim 5 wherein said coordinating means includes coupling means which operatively connects said multiple cam and follower means with said linear transport means to permit simultaneous selection of a predetermined blend and the corresponding price setting of said computer.

7. A device as set forth in claim 6 wherein said actuating means and said additional actuating means are interlocked with said selector means to require disengagement of said cone and idler gears in said computer and said proportion-varying control before said selector means varies the ratio settings of said computer and said proportion-varying control.

8. A device as set forth in claim 6 wherein said proportion-varying control includes two sets of said additional cone and idler gears, both of said additional idler gear carriages being connected to move in unison, and said transport means includes a threaded jack screw engaged with said connected additional idler gear carriages.

9. A device as set forth in claim 6 wherein said additional guide means includes smooth parallel-sided slots, said additional guide means being rotatably mounted upon said fluid-dispensing apparatus, said additional actuating means includes an operating linkage for rotating said additional guide means in planes perpendicular to the axes of said additional idler gear carriage shafts for disengaging said additional idler gears from the aligned step of said additional cone gears, and the opposite sides of said smooth slots being disposed a distance apart substantially equal to the width of said associated projection means to permit said additional guide means to both guide and move said additional carriages in engaging and disengaging directions.

10. A device as set forth in claim 9 wherein said linear transport means comprises a threaded jack screw, a manually-actuable rotatable shaft is accessibly mounted adjacent said device, and motion-transmitting means connects said rotatable shaft with said jack screw.

11. A device as set forth in claim 9 wherein said additional guide means are comprised of curved plates rotatably mounted relative to the axes of rotation of said idler gear carriages.

12. A device as set forth in claim 11 wherein resilient means reacts upon said additional guide means in a direction to cause said additional idler gear carriages to engage said additional guide means in a direction to cause said additional idler gear carriages to engage said additional idler gears with said additional cone gears.

13. A device as set forth in claim 10 wherein the steps of said additional cone gears are disposed in opposing inverted relationship, said additional idler gear carriages are interconnected to move longitudinally to aligned steps of said additional cone gears, and index means is associated with said rotatable shaft to position said additional idler gears in alignment with selected steps of said additional cone gears.

14. A device as set forth in claim 16 wherein stationary stepped guide surfaces corresponding in shape and arranged parallel to the silhouette of said additional cone gears are disposed behind said guide means slots in a position to precisely engage said additional idler gears with said additional cone gears when said guide plates are rotated to positions adjacent said additional cone gears.

15. A device as set forth in claim 12 wherein separate camming means are connected to said projection and slot means, a pin is movably mounted in the path of said camming means, and said pin and camming means are constructed and arranged to independently rotate said additional idler gear carriages to disengage said additional idler gears from said additional cone gears when said pin is moved into contact with said camming means, and said resilient means reacts between said separate camming means to cause said additional idler gears to independently drop into meshing engagement with respective additional cone gears.

16. A device for conveniently adjusting a quantity and price computer to a predetermined number of price settings, said computer including a cone and a number of associated idler gear assemblies rotatably mounted upon parallel shafts, said device comprising sets of multiple cam and follower means operatively associated with each of said idler gear assemblies, each of said multiple cam means including discrete elements corresponding in number to said predetermined number of price settings of said computer, said discrete elements being variable over a range of positions corresponding to the range of variable engagement of said associated sets of cone and idler gear assemblies, the follower means of each of said sets of multiple cam and follower means being operatively associated with said idler gear assemblies for causing said idler gear assemblies to be moved selectively into engagement and disengagement with said cone gear member, said multiple cam means having a number of stations corresponding to said predetermined number of price settings for selectively activating each of said discrete elements to engage respective idler gear assemblies with said cone gear at each of stations, a unitary selector means associated with said multiple cam means which is operable through a number of positions corresponding to said predetermined number of price settings, and a coordinating means connecting said unitary selector means with said multiple cam means for simultaneously adjusting them to respective stations which provide selected ones of said predetermined number of price settings in accordance with the selected positions of said unitary selector means.

17. A device as set forth in claim 16 wherein said multiple cam means each comprise a movable carrier member, said discrete elements comprising a number of cam tracks, said cam tracks being adjustably mounted upon said movable carrier member, and said coordinating means being connected to said movable carrier members for actuating them in response to movement of said unitary selector means.

18. A device as set forth in claim 17 wherein said movable carrier members comprise cylinders, and said cam tracks being mounted about the periphery of said cylinders with their axes disposed substantially in line with the axes of said cylinders.

19. A device as set forth in claim 18 wherein said unitary selector means comprises a control knob, and said control knob and said cylinders being secured in line with each other upon a common rotatable shaft.

20. A device as set forth in claim 16 wherein said discrete elements are movably mounted upon said multiple cam means, detent means engaging said discrete elements with said multiple cam means for permitting said discrete elements to be detachably maintained in each of said range of positions corresponding to said range of variable engagement of said associated cone and idler gear assemblies, and manually operable means associated with a said detent means for permitting said discrete elements to be adjusted to provide engagement of said cone and idler gear assemblies in any mode when said unitary selector means is adjusted to the station corresponding to said discrete element.

21. A device as set forth in claim 16 in combination with an apparatus for proportioning and dispensing a range of blends of the similar fluids, said apparatus including a control means operable to a predetermined number of stations corresponding to the range of blends dispensed by said apparatus, said number of predetermined station corresponding to said predetermined number of price setting of said computer, and a transmission connecting said unitary selector means to said control means for simultaneously providing a price setting of said computer corresponding to each of said blends.

22. A device for conveniently adjusting a quantity and price computer to a predetermined number of price settings, said computer including associated transmission and idler gear assemblies rotatably mounted upon parallel shafts, said device comprising sets of multiple cam and follower means operatively associated with each of said idler gear assemblies, each of said multiple cam means including discrete elements corresponding in number to said predetermined number of price settings of said computer, said discrete elements being variable over a range of positions corresponding to the range of variable engagement of said associated sets of transmission and idler gear assemblies, the follower means of each of said sets of multiple cam and follower means being operatively associated with said idler gear assemblies for causing respective idler gears to be moved seelctively into engagement and disengagement with respective transmission gears, said multiple cam means having a number of stations corresponding to said predetermined number of price settings for selectively activating each of said discrete elements to engage respective idler gears with said respective transmission gears at each of said stations, a unitary selector means associated with said multiple cam means which is operable through a number of positions corresponding to said predetermined number of price settings, and a coordinating means connecting said unitary selector means with said multiple cam means for simultaneously adjusting them to respective stations which provide selected ones of said predetermined number of price settings in accordance with the selected positions of said unitary selector means.

23. A device as set forth in claim 22 wherein said transmission gear assemblies comprise output gear assemblies.

24. A device as set forth in claim 22 wherein said transmission gear assemblies comprise a single transmission gear assembly, and all of said idler gear assemblies being associated with said single transmission gear assembly.

References Cited in the file of this patent
UNITED STATES PATENTS

| | | |
|---|---|---|
| 2,024,115 | Schwartz | Oct. 10, 1935 |
| 2,062,997 | Orbeck | Dec. 1, 1936 |
| 2,641,271 | Pressler | June 9, 1953 |
| 2,682,368 | Boutillon | June 29, 1954 |

FOREIGN PATENTS

| | | |
|---|---|---|
| 903,263 | France | Jan. 10, 1945 |
| 577,032 | Great Britain | May 2, 1946 |

UNITED STATES PATENT OFFICE
CERTIFICATE OF CORRECTION

Patent No. 3,047,220        July 31, 1962

Stephen George

It is hereby certified that error appears in the above numbered patent requiring correction and that the said Letters Patent should read as corrected below.

Column 2, line 18, for "poth" read -- both --; column 5, line 31, for "neutral" read -- central --; column 12, line 43 for "transmission" read -- transmissions --; line 67, for "there-by" read -- thereby --; column 17, line 29, after "of" insert -- said --; column 18, line 31, for "seelctively" read -- selectively --.

Signed and sealed this 27th day of November 1962.

(SEAL)
Attest:

ESTON G. JOHNSON
Attesting Officer

DAVID L. LADD
Commissioner of Patents